(12) United States Patent
Cabrera

(10) Patent No.: US 12,001,506 B2
(45) Date of Patent: *Jun. 4, 2024

(54) METHOD AND COMPUTER-READABLE MEDIUM FOR WEBSITE RENDERING

(71) Applicant: Ricardo Cabrera, Miami, FL (US)

(72) Inventor: Ricardo Cabrera, Miami, FL (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/963,169

(22) Filed: Oct. 10, 2022

(65) Prior Publication Data

US 2023/0032619 A1  Feb. 2, 2023

Related U.S. Application Data

(63) Continuation-in-part of application No. 17/239,029, filed on Apr. 23, 2021, now Pat. No. 11,500,957.

(51) Int. Cl.
*G06F 16/958* (2019.01)

(52) U.S. Cl.
CPC ................. *G06F 16/986* (2019.01)

(58) Field of Classification Search
None
See application file for complete search history.

(56) References Cited

U.S. PATENT DOCUMENTS

| | | | | |
|---|---|---|---|---|
| 10,572,126 | B2* | 2/2020 | Fitzpatrick | G06F 40/186 |
| 10,909,304 | B2* | 2/2021 | Fitzpatrick | G06F 40/143 |
| 10,936,179 | B2* | 3/2021 | Fitzpatrick | G06F 40/143 |
| 2008/0141116 | A1* | 6/2008 | Mohan | G06F 16/958 |
| | | | | 715/236 |
| 2009/0112824 | A1* | 4/2009 | Fu | G06F 16/9577 |
| 2014/0281909 | A1* | 9/2014 | Pinto | G06F 9/45529 |
| | | | | 707/810 |
| 2015/0019991 | A1* | 1/2015 | Kristjánsson | H04L 41/0853 |
| | | | | 715/747 |
| 2015/0339268 | A1* | 11/2015 | Bednarz, Jr. | G06F 40/14 |
| | | | | 715/248 |
| 2018/0032627 | A1* | 2/2018 | Margatan | H04L 67/535 |
| 2020/0344307 | A1* | 10/2020 | Livshits | H04N 21/25825 |
| 2020/0372205 | A1* | 11/2020 | Bradley | G06F 40/134 |
| 2021/0084120 | A1* | 3/2021 | Fisher | H04L 41/16 |

* cited by examiner

*Primary Examiner* — Ariel Mercado
(74) *Attorney, Agent, or Firm* — Boris Leschinsky

(57) ABSTRACT

Disclosed herein is a novel system and method for website rendering. In exemplary embodiments, the system and method comprise downloading a rendering engine onto a client device. The rendering engine retrieves or downloads website-specific data and website template data. The rendering engine merges the website-specific data and website template data. The rending engine obtains website assets identified by the merged data, and a template .css file. The rendering engine renders a website utilizing the merged data, the assets and the .css file.

11 Claims, 6 Drawing Sheets

METHOD AND COMPUTER-READABLE MEDIUM FOR WEBSITE RENDERING

CROSS-REFERENCE DATA

The present patent application is a continuation-in part of the co-pending U.S. patent application Ser. No. 17/239,029 filed on 23 Apr. 2021 and entitled SYSTEM, METHOD, AND COMPUTER READABLE MEDIUM FOR WEBSITE RENDERING, incorporated herein by reference in its entirety.

FIELD

The present invention relates to website rendering. More particularly, the present invention relates to efficient client-side website rendering.

BACKGROUND

Traditionally websites are created and hosted on website hosting servers residing on the internet. The servers are remote from the client devices, such as personal computers (PCs) and mobile computing devices, that browse the internet to download and display the website content. The website content and code typically reside on and are managed by a single server on the internet.

Traditional website hosting experience is associated with certain inherent problems which in the past have not been overcome. Those problems include: i) slow website service when the hosting server is under high demand, ii) website service interruption when the website hosting server is down, and iii) susceptibility to being attacked, for example by malicious distributed denial-of-service (DDoS) attacks wherein the hosting server is flooded with internet traffic. These problems all stem from the fact that the website content and code are stored on a single centralized server.

What is needed is a system and method for rendering websites that remedy the problems inherent in the traditional server-based website hosting architecture. More specifically, what is needed is a system and method for rendering websites that don't depend on a single server for access and rendering and therefore are not slowed by high demand, are not shut down when the hosting server is down and are not susceptible to malicious attacks such as distributed denial-of-service (DDoS) attacks. Additionally, what are needed are a system and method for rendering websites that are more cost-effective by making use of ever-increasing client device computing power rather than relying on the computing power of costly website hosting services.

SUMMARY

In exemplary embodiments of the present invention, efficient and effective systems and methods for website rendering are provided. In exemplary embodiments, the data required for website rendering is made available to client devices by way of a distributed content delivery network (CDN), along with a rendering engine application that is downloaded to a client device. Moreover, a website is rendered by efficiently merging website-specific data embodied in a client-specific website configuration file (as described in more detail below) with a more generic website template data embodied in a template configuration file (as described in more detail below).

An exemplary method according to the present invention comprises executing a rendering engine application on a client device. A website configuration file is retrieved internally from the rendering engine application or downloaded from the internet. An associated website template is determined from the website configuration file and/or retrieved from the rendering engine application itself, using a template ID, for example, A merged configuration file is created that comprises both website configuration file data and template configuration file data, wherein at least some generic data of the template file is overwritten by client-specific data from the website configuration file. A website is then rendered by the rendering engine application on a client device based upon the merged configuration file. The method also allows for third party plug-in development partners to develop compatible plug-ins providing for a variety of third-party services to be added to the website when approved by the user.

An exemplary system according to the present invention comprises a cloud-based storage. The cloud-based storage comprises a plurality of template stores, each comprising a template asset store and a template configuration file, which may be associated with a certain unique template identification number or name. The cloud-based storage also comprises a plurality of website stores, each comprising a website asset store and a website configuration file, which may be customized using individual client data, for example, business name, address, field of business, etc.

The cloud-based storage further comprises a rendering engine configured to be downloaded as an application to a remote client device, which may also include one or more suitable website templates and/or pre-installed plug-ins. The rendering engine is also configured to create a merged configuration file comprising template configuration file data and website configuration file data and to render a website based upon the merged configuration file.

Another exemplary embodiment of the present invention comprises a non-transitory computer-readable medium storing a program that, when executed by a computer processor, causes the computer processor to perform a method for rendering a website. When the program is executed, a rendering engine application runs on a client device. A website configuration file is retrieved from the internet. An associated website template is determined from the website configuration file or retrieved from the rendering engine application. Also, a template configuration file associated with the website template may be retrieved from the internet. A merged configuration file is created that comprises both website configuration file data and template configuration file data. A website is rendered on a client device based upon the merged configuration file.

BRIEF DESCRIPTION OF DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

So that the manner in which the features and advantages of embodiments of methods and systems of the present invention may be understood in more detail, a more particular description of the present invention briefly summarized above may be had by reference to certain embodiments thereof that are illustrated in the appended drawings, which form a part of this specification. The drawings illustrate only certain embodiments of the present invention and are, therefore, not to be considered limiting of the scope of the present invention which includes other useful and effective embodiments as well.

The systems according to one exemplary embodiment of the present invention will be described generally, and further detail will be provided below.

Figure 1B:
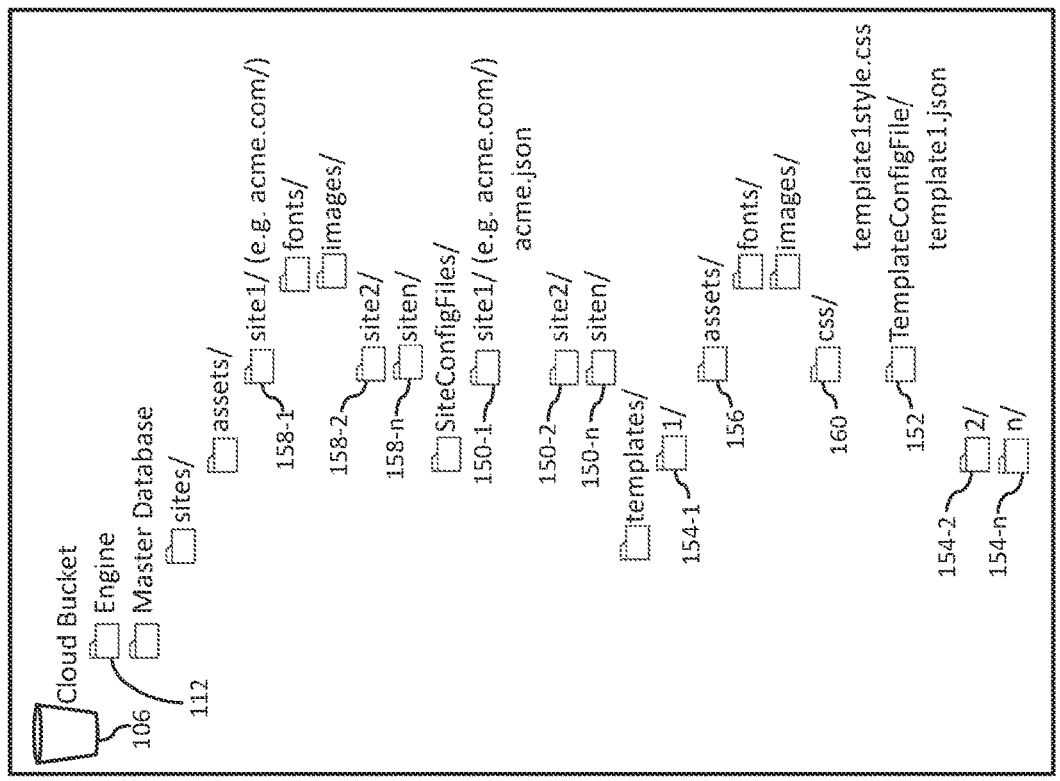
FIG. 1B illustrates the file structure of digital elements implemented for use according to exemplary embodiments of the present invention.
Figure 1A:
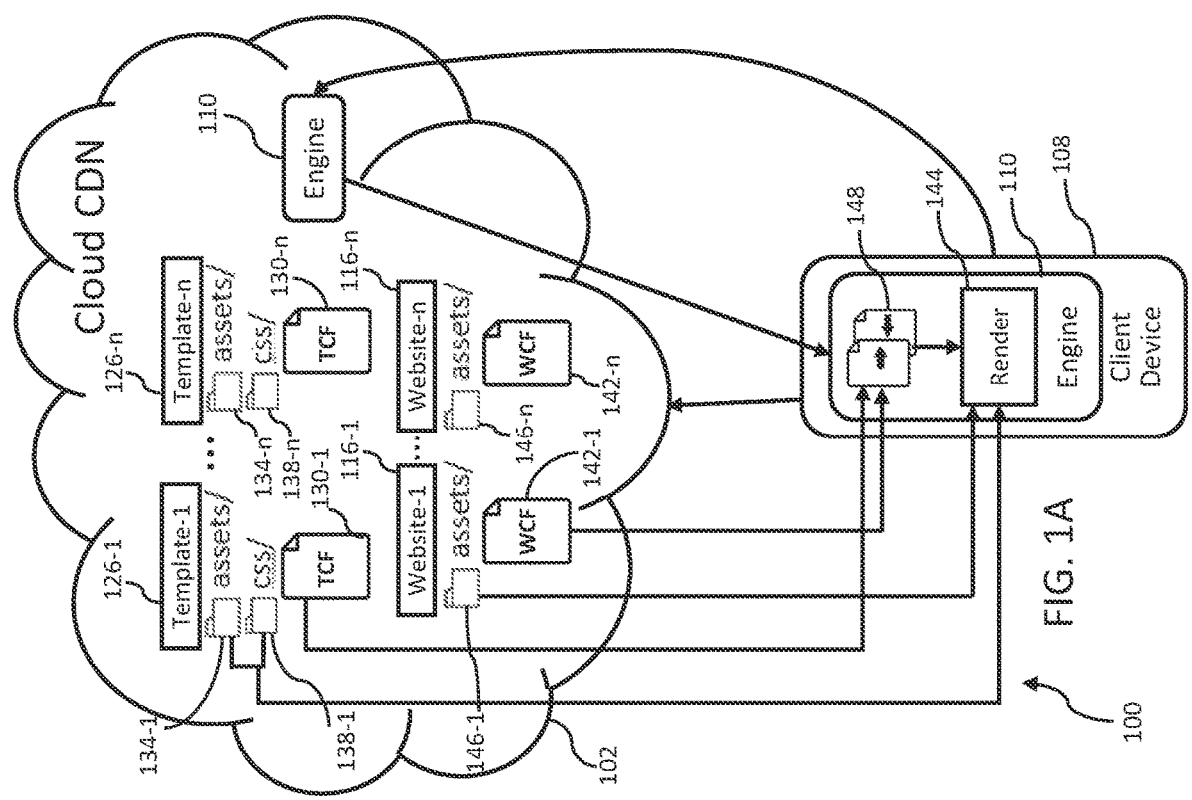
FIG. 1A is a block diagram of a system for website rendering according to an exemplary embodiment of the present invention.

FIG. 1A is a block diagram of a system for website rendering according to an exemplary embodiment of the present invention. In the exemplary embodiment, system 100 comprises a cloud-based content distribution network (CDN) 102. CDN 102 serves digital files to client devices such as client device 108 which may be, for example, a personal computer (PC) or a mobile computing device such as a smartphone or a tablet computer. In exemplary embodiments, client device 108 browses the internet with the objective of visiting a website associated with one of the plurality of websites whose specific content is included in one of website stores $116_1$ through $116n$, as will be described further below.

In this example, CDN 102 holds and serves a plurality of website template stores (i.e. digital files) $126_1$ through $126n$. The content of website template stores $126_1$ through $126n$ are digital files that can be used to render generic template websites designed for a variety of different categories, such as home improvement services on the one hand and beauty and personal care services on the other hand. Data defining certain aspects of respective template websites are contained in respective template configuration files $130_1$ through $130n$. Assets such as fonts and images required for the respective template websites are contained in respective asset files $134_1$ through $134n$. Cascade style sheets (.css files) that are used to render websites according to respective templates are contained in files $138_1$ through $138n$.

CDN 102 also holds and serves website-specific stores $116_1$ through $116n$. The content of website stores 116 through $116n$ are digital files associated with specific internet websites. Data defining certain aspects of respective specific websites, such as, for example, address information, "about" content, and a significant amount of other business-specific information, are contained in respective website configuration files $142_1$ through $142n$. Assets such as fonts and images required for the respective websites are contained in respective asset files $146_1$ through $146n$.

When data and files from a website store, for example website store $116_1$, are integrated with data and files from a template store, such as template store $126_1$, a merged data configuration file and an associated collection of assets are provided that will render a specific website based upon the template of template store $126_1$, but with specific business information and visual assets from website store $116_1$.

CDN 102 also holds and serves the rendering engine 110. As will be explained in more detail below, when client 108 searches for one of the websites of website stores $116_1$ through $116n$, rendering engine application 110 is downloaded to client 108. Rendering engine application 110 retrieves the website configuration file associated with the website of interest, for example, file $142_1$. Website configuration file $142_1$ includes data indicating which template website it is to be integrated with, such as a template ID.

In this exemplary embodiment, engine 110 then retrieves internally or downloads from the internet the selected template configuration file, for example, template configuration file $130_1$. Engine 110 then creates a merged configuration file 148. Merged configuration file 148 comprises the template configuration file, for example, file $130_1$, but with any information that is different from the website configuration file, for example, file $142_1$, overwriting the corresponding information that was in the template configuration file, thereby creating a client-specific merged configuration file.

Merged configuration file 148 therefore also indicates which template assets from asset store $134_1$ or from the rendering engine 110 itself are required to render the website, and which website-specific assets from asset store $146_1$ are required to render the website. The rendering engine application 110 retrieves those assets. Additionally, rendering engine application 110 retrieves any selected plug-ins and the .css file associated with the applicable website template, in this example .css file $138_1$. Engine 110 renders the website indicated by render operation 144, using the template .css file, the combined assets, any plug-ins if selected by the user, and the merged configuration file as described above.

Now, turning to a more detailed description of systems and methods according to the present invention, FIG. 1A is a block diagram of an exemplary embodiment of a system 100 consistent with the present invention. The significant digital elements that are part of system 100 reside in the cloud-based content delivery network (CDN) 102, In an exemplary embodiment, CDN 102 may be AMAZON CLOUDFRONT content delivery network. An exemplary file arrangement of the content of CDN 102 is depicted in the file structure 104 shown in FIG. 1B. More specifically, a cloud-based CDN 102 of FIG. 1A corresponds to Cloud Bucket 106 of FIG. 1B.

FIG. 1A also illustrates client device 108. In exemplary embodiments, client device 108 may be a personal computer (PC), or a mobile computing device such as a smartphone or a tablet computer. According to implementations and uses of exemplary embodiments of the present invention, client device 108 browses the internet to find and display desired websites.

According to embodiments of the present invention, a website of interest that is configured to be rendered using the methods and systems consistent with the present invention has a URL that points to the rendering engine application 110 that is served and made available by CDN 102. Rendering engine 110 of FIG. 1A is found in folder 112 in file structure 104 of FIG. 1B. According to certain embodiments, the URL of the website can be pointed to rendering engine 110 by a canonical name (CNAME) record implemented for the URL. According to alternate embodiments, the URL of the website can be pointed to rendering engine 110 by an address record (A-Record) implemented for the URL It will be recognized that both a CNAME and an A-Record are respective types of Domain Name System (DNS) entries.

In response to client device 108 being led to the rendering engine 110, CDN 102 facilitates downloading the rendering engine 110 to client device 108. According to preferred embodiments, the rendering engine 110 executes on client device 108. The rendering engine 110 parses the URL of the website of interest and communicates with CDN 102 to locate and retrieve the website configuration file associated with that website, for example website configuration file $142_1$. Website configuration files $142_1$ through $142n$ are located in folders $150_1$ through $150n$ in file structure 104. In exemplary embodiments, website configuration files $150_1$ through $150n$ may be formatted as JavaScript Object Notations (.json) files.

Website configuration file $142_1$ contains data identifying which website template is to be utilized to render the website. Based on that data, the rendering engine 110 retrieves internally or downloads from the internet the templated configuration file, for example template configuration file $130_1$, for the identified template. Template configuration file $130_1$ is located in folder 152 in file structure 104. The remaining template configuration foes are nested within template foes $154_2$ through $154n$ similarly. In exemplary embodiments, template configuration files $130_1$ through $130n$ may be formatted as JavaScript Object Notations (.json) files.

Rendering engine application 110 creates a merged configuration file 148 by overwriting information in template configuration file $130_1$ with corresponding information from website configuration file $142_1$. For example, template configuration file $130_1$ will at first have placeholder information for a business address. Website configuration file $142_1$ will have the actual business address for the business represented by the website to be rendered. The placeholder business address will be overwritten with the actual business address when creating merged configuration file 148.

Similarly, template configuration file $130_1$ has information identifying placeholder assets that are contained in template asset store $134_1$, for example, a default placeholder "hero" image that appears in large format at the top of a home page. Website configuration file $142_1$ may or may not identify a different hero image which, if identified, will be in asset store $146_1$. If website configuration file $142_1$ identifies a different image, that identification information will overwrite the default image identification in merged configuration file 148.

In exemplary embodiments, after creating merged configuration file 148, the rendering engine application 110 can now identify, retrieve from itself or download from the internet such as from the template asset store $134_1$ those template assets identified in merged configuration file 148. Similarly, rendering engine application 110 can now identify and download from website specific asset store $146_1$ those website specific assets identified in merged configuration file 148. Assets of template asset store $134_1$ are found in folder 156 of file structure 104. The remaining template assets are nested within template files $154_2$ through $154n$ similarly. Additionally, website specific assets $146_1$ through $146n$ can be found in folders $158_1$ through $158n$ in file structure 104.

Rendering engine 110 also retrieves the .css file associated with the template website that is the basis for the website to be rendered. For example, engine 110 retrieves template .css files $138_1$. Template .css file $138_1$ is found in folder 160 of file structure 104. The remaining template .css files are nested within template files $154_2$ through $154n$ similarly. Engine 110 can now render (144) the desired website for the client device utilizing template .css file $138_1$, assets from both template asset store $134_1$ and website specific asset store $146_1$, and merged configuration file 148.

Figure 2:
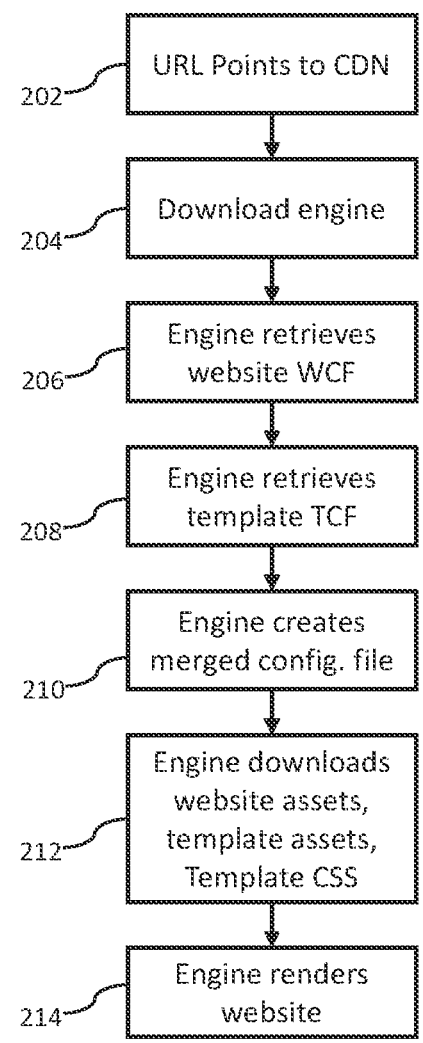
FIG. 2 is a flowchart illustrating a method according to an exemplary embodiment of the present invention.

Turning now to FIG. 2, shown is a flowchart illustrating a method of operation consistent with the foregoing description of exemplary embodiments of the present invention. Specifically, at step 202, a client device 108 (of FIG. 1A) seeks a URL that points to engine 110 (of FIG. 1A) residing in CDN 102 (of FIG. 1A). At step 204 engine 110 is downloaded to client device 108.

At step 206 the rendering engine 110 retrieves the website configuration file associated with the website of interest. At step 208 the rendering engine 110 retrieves the template configuration file associated with the template that is identified in the website configuration file. At step 210 the rendering engine application 110 creates a merged configuration file.

At step 212, the rendering engine application 110 retrieves internally or downloads from the internet source the website-specific and template digital assets identified by the merged configuration file, and the template .css file. Examples of such assets include logo, graphic files, client-specific video files, etc. At step 214 the rendering engine 110 application renders the website on the client device 108.

Figure 3:
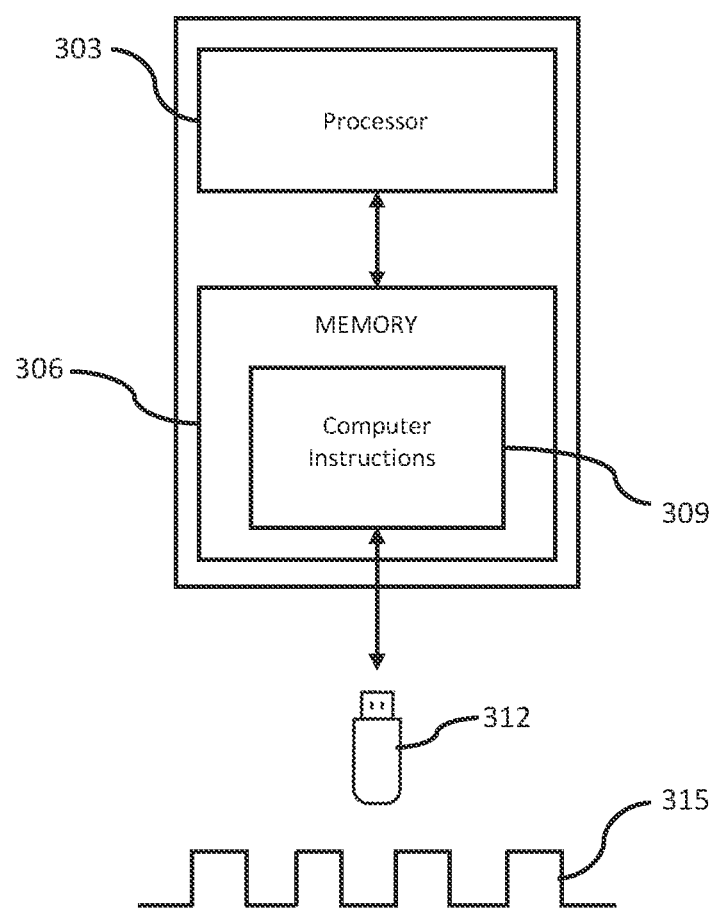
FIG. 3 is a block diagram illustrating a non-transitory computer-readable medium storing a program that, when executed by a computer processor, causes the computer processor to perform a method for website rendering according to an exemplary embodiment of the present invention.

Turning for FIG. 3, shown is a block diagram illustrating a non-transitory computer readable medium storing a program that, when executed by a computer processor, causes the computer processor to perform a method for website rendering consistent with embodiments of the present invention. More specifically, FIG. 3 illustrates processor 303, memory 306, computer instructions 309, computer readable storage medium 312, and computer readable digital signal 315.

In an exemplary embodiment of the present invention processor 303 is a computer processor residing in client 108 (of FIG. 1A). Computer instructions 309 are the computer instruction that, when executed by processor 303, executing a method for website rendering consistent with the embodiment show in FIG. 2. Computer instructions 309 reside in memory 306, which is computer memory that resides in client device 108. Computer instructions 309 may be read from computer-readable storage medium 312 or computer-readable digital signal 315 by processor 303 and stored by processor 303 permanently, semi-permanently, or temporarily, in memory 306. In this exemplary embodiment, computer-readable storage medium 312 comprises a flash memory stick.

Figure 4:
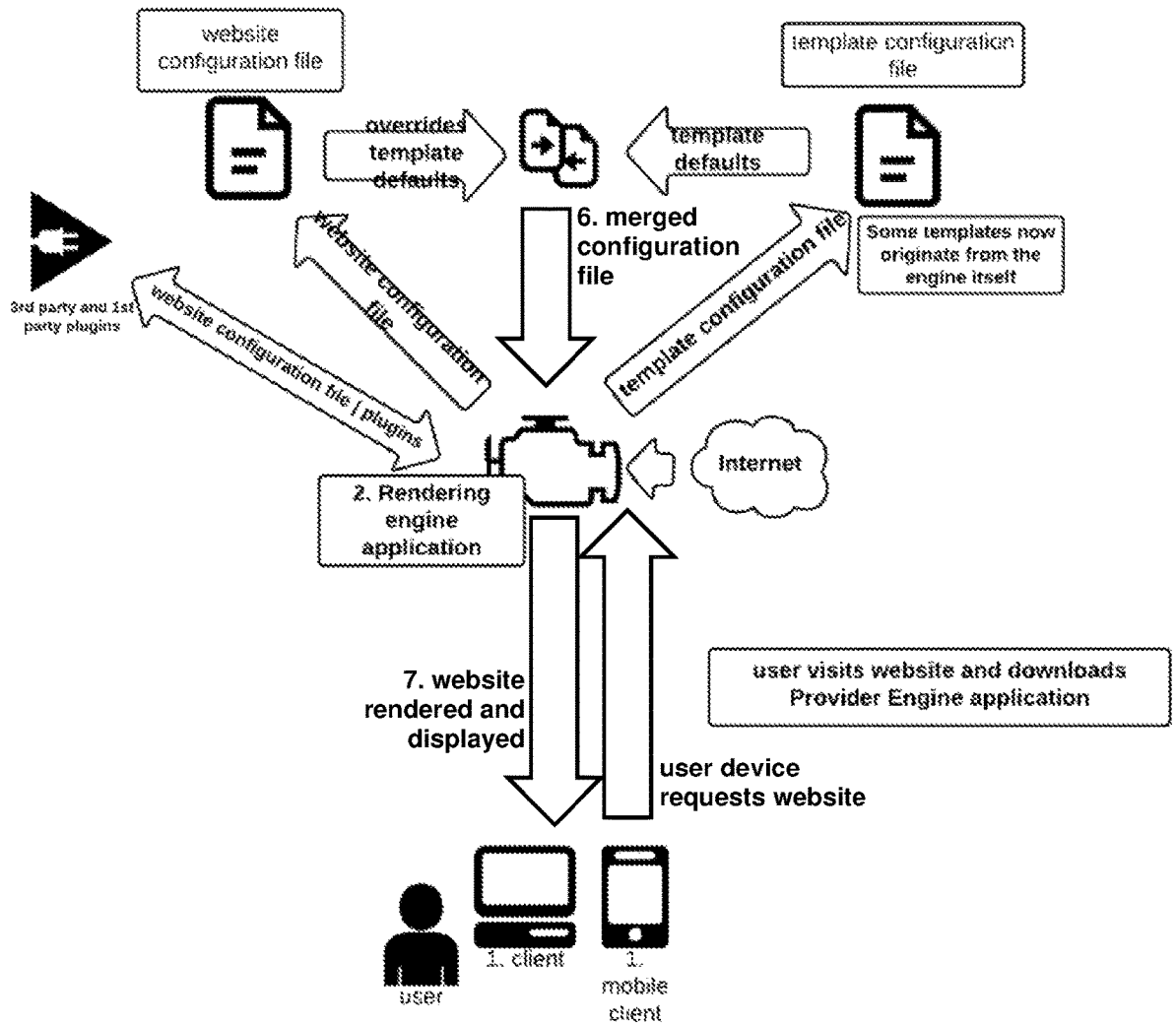
FIG. 4 is a block diagram of an alternative method of the present invention.
Figure 5A:
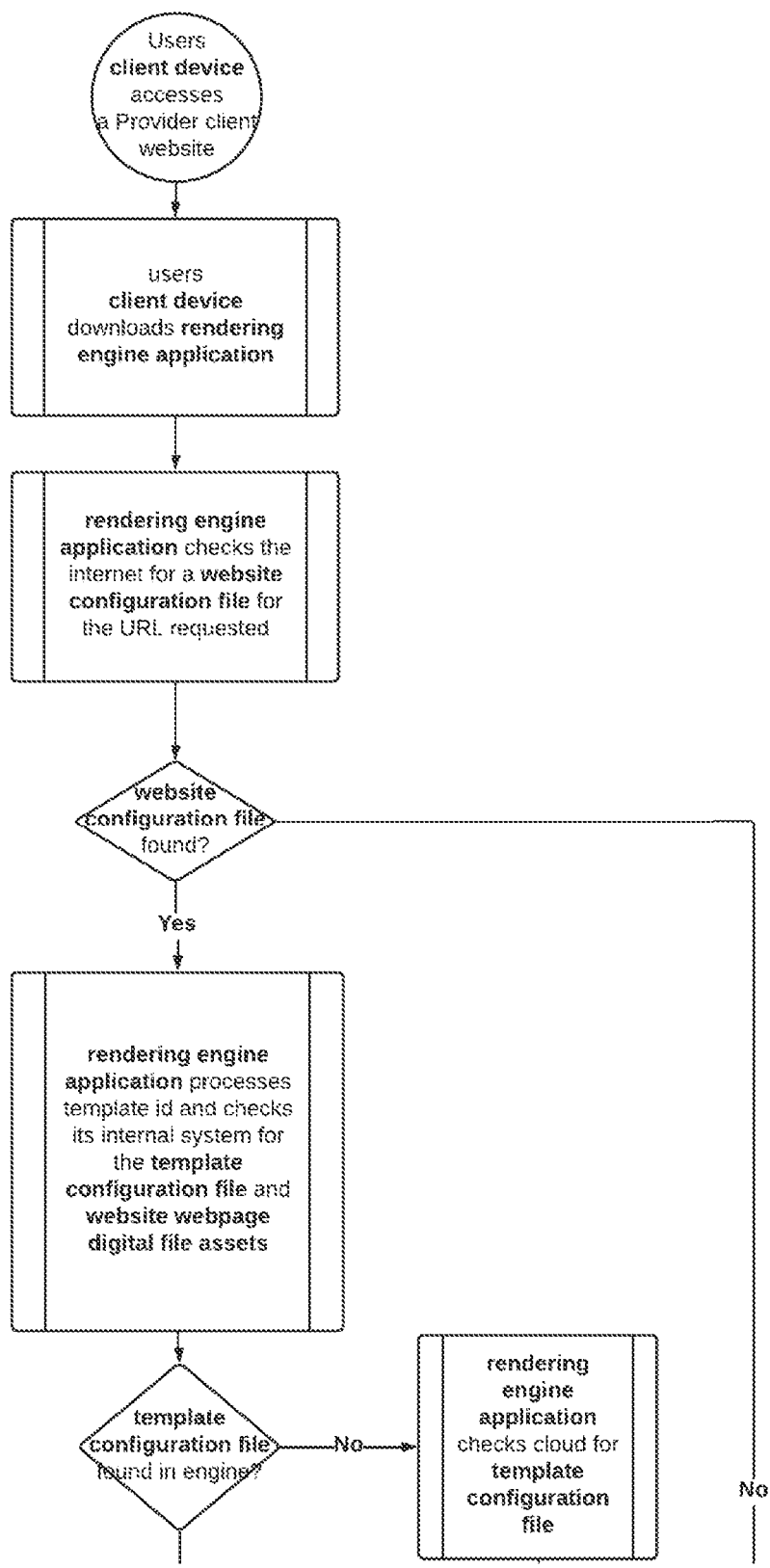
FIGS. 5a and 5b show a flowchart of activities according to the alternative method of the invention.
Figure 5B:
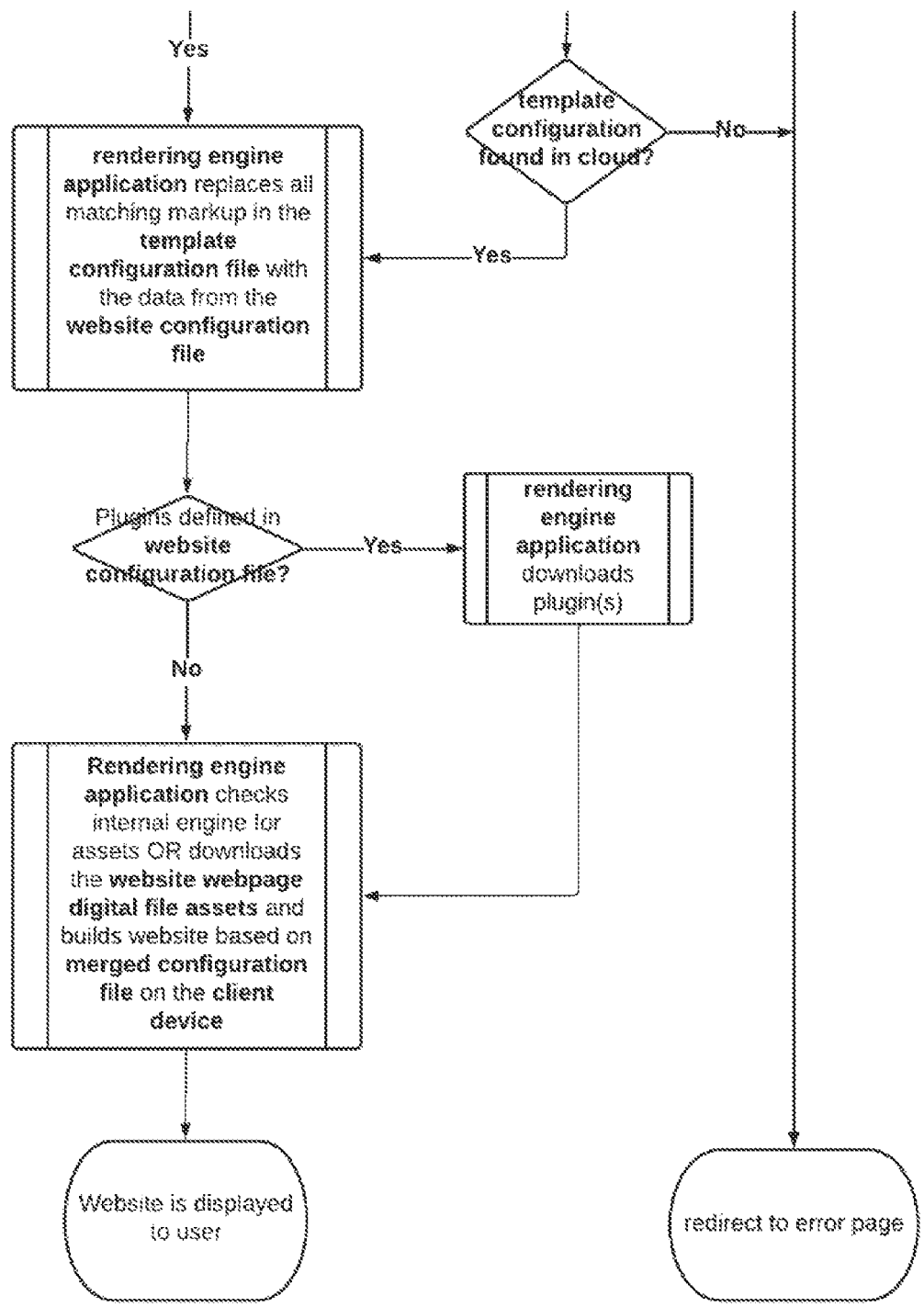

FIGS. 4, 5a, and 5b illustrate alternative methods of the present invention, wherein the rendering engine application 110 downloaded from the internet may contain the website configuration file which in turn may include data identifying a website template. The website template may have an associated template configuration file different from the website configuration file. Template files may be downloaded from the internet source and/or may be provided as part of the rendering engine itself. In this case, they may be downloaded by the user as part of the downloaded rendering engine 110. In embodiments; one or more website configuration and template files may be contained within the rendering engine application itself. Upon checking if the selected template is already available (this can be done using a unique template ID), the rendering engine is configured to seek the template file externally from an internet source if it is not found to be available internally. A variety of external sources of template files may be used for this purpose such as the internet, template stores, user files, previously used templates and others.

Once the suitable template configuration file is identified and provided, the rendering engine application is configured to replace all matching meta markup in the template file with data from the client interchange file so to make the template client-specific as described in greater detail above.

The next optional step may be to check if there are any plug-ins that are specified in the website configuration file (see FIG. 5b). The method of the invention allows one or more plug-ins to be developed by third-party providers to be incorporated into the client website either initially or over time. Such plug-ins may include, for example, plug-ins for a third-party provider of goods or services such as Google analytics, WhatsApp or other social media or messaging service, FedEx or another shipping service, and so on. If such plug-in is identified in the website configuration file, the rendering engine application 110 may be configured to extract a suitable plug-in internally or download from a specified external location and incorporate the plug-in into the client website.

Once all procedures illustrated in FIGS. 5a and 5b are completed, the website may be rendered, displayed to the user and be prepared for use over the internet.

Consequently, what is provided by exemplary systems and methods according to the present invention is a system and method for rendering websites that address the problems inherent in the traditional server-based website hosting architecture. In particular, a system and method are provided for rendering websites that do not depend on a single server for access and rendering, and therefore are not slowed by high demand, are not shut down when the hosting server is down and are not susceptible to malicious attacks such as distributed denial-of-service (DDoS) attacks. Also, a system and method for rendering websites are provided that are more cost effective by making use of ever-increasing client device computing power, rather than relying on the computing power of costly website hosting services.

Some portions of this description describe the embodiments of the invention in terms of algorithms. These operations, while described functionally, computationally, or logically, are understood to be implemented by computer programs or equivalent electrical circuits, micro-code, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium or any type of media suitable for storing electronic instructions, which may be coupled to a computer system bus. Furthermore, any computing systems referred to herein may include a single processor or may be implemented with architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

The various embodiments can be further implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as database management. These devices can also include other electronic devices, such as dummy terminals, virtual terminals, thin-clients, and other devices capable of communicating via a network.

Embodiments can utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, or any combination thereof.

In embodiments utilizing a Web server, the Web server can run any of a variety of server or mid-tier applications, including HTTP servers, FTP servers, CGI servers, data servers, Java® servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as the Perl scripting language, the Python scripting language, or the TCL scripting language, as well as combinations thereof.

The server(s) may also include database servers, including without limitation those commercially available from Oracle®, Microsoft®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element, or keypad) and at least one output device (e.g.; a display screen, a display device, printer, or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed, and/or removable storage devices as well as storage media for temporarily and/or more permanently containing, storing, transmitting, and retrieving computer-readable information. The system and various devices also can include a number of software applications, modules, services, or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets, APIs, scripts, and the like), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments and that many modifications and variations are possible.

The foregoing description of the embodiments of the invention has been presented for the purpose of illustration; it is not intended to be exhaustive or to limit the invention to the precise forms disclosed. The description and drawings are, accordingly, to be regarded in an illustrative rather than a restrictive sense. The language used in the specification has been principally selected for readability and instructional purposes. It is therefore intended that the scope of the invention be limited not by this detailed description and drawings, but rather by any claims that issue based on this application. It will, however, be evident that various modifications and changes may be made thereunto without departing from the broader spirit and scope of the invention as set forth in the claims.

What is claimed is:

1. A method for website rendering comprising the steps of:
    executing a rendering engine application on a client device;
    retrieving internally or downloading from an external internet source a website configuration file, the website configuration file including data identifying a website template, the website template having an associated template configuration file different from the website configuration file;
    retrieving internally or downloading from the external internet source the template configuration file associated with the website template;
    creating locally on the client device, from a combination of the website configuration file and the template configuration file each being stored independently and locally on the client device, a merged configuration file comprising both website configuration file data and template configuration file data, wherein at least some data from the template configuration file is overwritten in the merged configuration file by corresponding client-specific data from the website configuration file;
    downloading from a website asset store, website webpage digital file assets identified by the website configuration file data;
    downloading from a template asset store, template webpage digital file assets identified by the template configuration file data; and
    rendering a website on the client device based upon the merged configuration file.

2. The method of claim 1, further comprising: obtaining the rendering engine application from the external internet source by pointing a URL to a cloud location of the rendering engine application using an address record (A-Record).

3. The method of claim 1, wherein the rendering engine application, the website configuration file, and the template configuration file are made available by cloud-based content delivery network (CDN).

4. The method of claim 1, wherein the website configuration file, the template configuration file and the merged configuration file are in JavaScript Object Notations (.json) format.

5. The method of claim 1, further comprising: a step of downloading the rendering engine application to a mobile computing device.

6. The method as in claim 1, wherein the website configuration file includes at least one plug-in for a third party provider, goods or services.

7. A non-transitory computer-readable medium storing a program that, when executed by a computer processor, causes the computer processor to perform a method for website rendering comprising the steps of:
    executing a rendering engine application on a client device;
    retrieving internally or downloading from an external internet source a website configuration file, the website configuration file including data identifying a website template, the website template having an associated template configuration file different from the website configuration file;
    retrieving internally or downloading from the external internet source the template configuration file associated with the website template;
    creating locally on the client device, from a combination of the website configuration file and the template configuration file each being stored independently and locally on the client device, a merged configuration file comprising both website configuration file data and template configuration file data, wherein at least some data from the template configuration file is overwritten in the merged configuration file by corresponding client-specific data from the website configuration file;

downloading from a website asset store, website webpage digital file assets identified by the website configuration file data;

downloading from a template asset store, template webpage digital file assets identified by the template configuration file data; and rendering a website on the client device based upon the merged configuration file.

8. The non-transitory computer-readable medium of claim 7, the method further comprising: obtaining the rending engine application from the external internet source by pointing a URL to a cloud location of the rendering engine using an address record (A-Record).

9. The non-transitory computer-readable medium of claim 7, the method further comprising: making available by a cloud-based content delivery network (CDN) the rendering engine application, the website configuration file, and the template configuration file.

10. The non-transitory computer-readable medium of claim 7, wherein the website configuration file, the template configuration file and the merged configuration file are in JavaScript Object Notations (.json) format.

11. The non-transitory computer-readable medium of claim 7, the method further comprising: the step of-downloading the rendering engine to a mobile computing device.

* * * * *